(12) United States Patent
Bringewatt et al.

(10) Patent No.: US 11,047,086 B2
(45) Date of Patent: Jun. 29, 2021

(54) METHOD AND APPARATUS FOR SPREADING OUT LAUNDRY ITEMS

(71) Applicant: Herbert Kannegiesser GmbH, Vlotho (DE)

(72) Inventors: Wilhelm Bringewatt, Porta Westfalica (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 119 days.

(21) Appl. No.: 16/409,412

(22) Filed: May 10, 2019

(65) Prior Publication Data

US 2019/0352840 A1 Nov. 21, 2019

(30) Foreign Application Priority Data

May 15, 2018 (DE) .......................... 102018003875.1

(51) Int. Cl.
*D06F 67/04* (2006.01)
*B65G 47/90* (2006.01)
*B65H 9/12* (2006.01)
*D06F 95/00* (2006.01)

(52) U.S. Cl.
CPC ............. *D06F 67/04* (2013.01); *B65G 47/90* (2013.01); *B65H 9/12* (2013.01); *D06F 95/00* (2013.01)

(58) Field of Classification Search
CPC .......... D06F 67/00; D06F 67/04; D06F 85/00; B65G 47/02; B65G 47/04; B65G 47/90; B65H 9/12
See application file for complete search history.

(56) References Cited

U.S. PATENT DOCUMENTS

| | | | | |
|---|---|---|---|---|
| 3,706,450 A | * | 12/1972 | Gerstenberger | ........ D06F 89/00 |
| | | | | 493/14 |
| 4,338,282 A | * | 7/1982 | Motooka | ................. D06F 95/00 |
| | | | | 134/15 |
| 4,463,944 A | * | 8/1984 | Grantham | .......... B65H 31/3054 |
| | | | | 271/175 |

(Continued)

FOREIGN PATENT DOCUMENTS

| | | |
|---|---|---|
| DE | 4143069 A1 | 7/1993 |
| EP | 2045391 A2 | 4/2009 |

(Continued)

OTHER PUBLICATIONS

European Patent Office, Europaischer Recherchenbericht (searchin a related application), Sep. 5, 2019.

*Primary Examiner* — Ismael Izaguirre
(74) *Attorney, Agent, or Firm* — Laurence P. Colton; Smith Tempel Blaha LLC (57) ABSTRACT

A method and apparatus that makes provision for a length of a transverse edge of a laundry item to be spread out to be measured upstream of a spreading device, to be precise preferably from above. It is thereby possible to individually determine the length of the transverse edge for each individual laundry item before the laundry item is situated in the spreading device. The length dimension of the transverse edge determined upstream of the spreading device can then be used to move apart the spreading clamps of the spreading device in a targeted and controlled manner in order to spread out the transverse edge in as gentle a manner as possible.

14 Claims, 6 Drawing Sheets

(56) References Cited

U.S. PATENT DOCUMENTS

| | | | | |
|---|---|---|---|---|
| 4,774,505 A | * | 9/1988 | Ueda | B61B 10/025 |
| | | | | 198/464.3 |
| 8,028,444 B2 | * | 10/2011 | Heinz | D06F 95/00 |
| | | | | 38/143 |
| 9,187,253 B2 | * | 11/2015 | Olivieri | D06F 67/04 |

FOREIGN PATENT DOCUMENTS

| | | |
|---|---|---|
| EP | 3147405 A1 | 3/2017 |
| EP | 3181752 A1 | 6/2017 |

* cited by examiner

METHOD AND APPARATUS FOR SPREADING OUT LAUNDRY ITEMS

CROSS REFERENCE TO RELATED APPLICATIONS

This patent application claims the benefit of and priority on German Patent Application No. 10 2018 003 875.1 having a filing date of 15 May 2018.

BACKGROUND OF THE INVENTION

Technical Field

The invention relates to a method for spreading out laundry items, a laundry item held in each case at two adjacent corner regions or corners of an edge by two spreading clamps of a spreading device being spread out by targeted movement apart of the spreading clamps while taking into consideration the determined length of the edge, in order to eliminate or at least largely eliminate the sag of the edge of the laundry item. The invention further relates to an apparatus for spreading out laundry items, having a spreading device which has at least two spreading clamps, which can be moved apart and together, for adjacent corner regions or corners of an edge of the respective laundry item, and having at least one detection means for determining the length or the sag of the front edge of the laundry item to be stretched out by the spreading device.

Prior Art

Laundry items, specifically in particular so-called flat linen such as table linen, bed linen and the like, are fed from a feeding machine to a following laundry treatment device, for example a mangle. The laundry items are first spread out by the feeding machine in order, in the spread-out state, to be able to be fed to the following laundry treatment machine, for example mangle.

To spread out the laundry items, feeding machines have a spreading device with one or more spreading clamp pairs. Each spreading clamp pair has two spreading clamps which can be moved apart and together transversely to the feeding direction of the laundry items to be spread out to the following laundry treatment device. When moving apart the spreading clamps, which respectively hold a laundry item, of the respective spreading clamp pair, the laundry item held by the spreading clamps is spread out and in so doing a sag between adjacent corner regions of the upper edge of the laundry item which are held by the spreading clamps of the respective spreading clamp pair is at least reduced, preferably approximately eliminated. The spreading clamps are also moved in such a way that they center the respective laundry item centrally on the intended feed path of the feeding machine.

The spreading out of the laundry item may only occur in such a way that the edge, which is held between adjacent corner regions, in particular corners, by the spreading clamps of the respective spreading clamp pair, and which is also referred to in the following as "edge to be spread out" and/or "front edge", is not excessively stretched.

It is already known to avoid the excessive stretching of the front edge to be spread out of the respective laundry item, in particular the transverse edge, which leads in the feeding direction, of the laundry item, by measuring the sag or the length of the front edge or of the front transverse edge of the laundry item using at least one detection means or a detection device. With respect to the spreading of the laundry item that occurs transversely to the feeding direction, this length of the upper edge corresponds to the width of the laundry item. The measurement of the length of the edge or of the width of the laundry item occurs after suspending the latter in the spreading clamps. This adversely affects the duration of the spreading out of the laundry item by the spreading device, because the respective detection device has to determine the length of the front edge or the width of the respective laundry item during the spreading thereof.

BRIEF SUMMARY OF THE INVENTION

The object on which the invention is based is to provide a method and an apparatus for spreading out laundry items, whereby the respective laundry item can be spread out reliably and above all also in a gentle manner.

A method for achieving this object is a method for spreading out laundry items, a laundry item held in each case at two adjacent corner regions or corners of an edge by two spreading clamps of a spreading device being spread out by targeted movement apart of the spreading clamps while taking into consideration the determined length of the edge, in order to eliminate or at least largely eliminate the sag of the edge of the laundry item, wherein, before transferring the corner regions or corners of the edge of the laundry item to the spreading clamps, with adjacent corner regions or corners of the edge of the laundry item held by holding means arranged upstream of the spreading device, the edge between the corner regions or corners of the respective laundry item which are held by the holding means is measured and the length of the edge is determined therefrom. Accordingly, there is provision, even before transferring the corner regions of the edge of the laundry item to the spreading clamps, to measure the edge, with corner regions held in holding means arranged upstream of the spreading device. The length, which extends over the width of the laundry item (as seen in the feeding direction), of the edge, in particular the leading transverse edge, situated between corner regions held by holding means, of the respective laundry item can thus preferably be determined before the latter is spread by the spreading device. The length of the front edge, in particular front transverse edge, to be stretched by the spreading device, of the respective laundry item is thus already known before the latter is spread out. As a result, the spreading device is freed from the determination of the length and/or sag of the edge of the respective laundry item, and the spreading operation, in particular its cycle time, is thus shortened.

There is preferably provision that the measurement of the edge, held at its adjacent corner regions by the holding means, of the respective laundry item is determined with the spacing of the holding means remaining the same, preferably with the holding means instantaneously at a standstill. Without thereby lengthening the cycle time for the spreading out of the respective laundry item, this measurement can occur while the laundry item is provided in the holding means upstream of the spreading device, that is to say awaits the transfer to the spreading clamp pair becoming free next. The measurement, in particular determination of the length, of the front edge or of the leading transverse edge of the laundry item can thus occur as it were statically with the laundry item at a standstill.

In an advantageous development of the method, there is provision to carry out the measurement of the edge, held at its adjacent corner regions or corners by the holding means, of the respective laundry item from above. There is preferably provision that this occurs using at least one detection means arranged above the edge to be measured. Given a horizontal imaginary connection line between the holding means and the opposite corner regions of the edge which are held by them, a measurement axis of the at least one detection means extends in a perpendicularly directed manner at a right angle to the imaginary connection line, with the connection line and the measurement axis of the at least one detection means lying in a common vertical plane. If the respective laundry item hangs down unimpeded from the holding means, this vertical plane is simultaneously the plane of the laundry item hanging down from the holding means.

Measuring the edge of the respective laundry item from above means that the measuring accuracy is greater because above all disturbing influences related to the surroundings are eliminated. In particular, a situation is thus prevented in which other laundry items situated ahead of and/or behind the respective laundry item to be spread out impede or negatively influence the measurement of the upper edge of the laundry item.

An advantageous embodiment possibility of the method makes provision for the length, which corresponds to the width of the laundry item, of the upper edge of the laundry item to be determined by the at least one detection means, arranged above said edge, by means of a contactless spacing measurement. In particular, in this spacing measurement, the lowest point or the lowest region of the sagging upper edge of the laundry item which is to be stretched out by the spreading device is already determined upstream of the spreading device. Such a measurement can be carried out simply and reliably, for example by means of analog sensors.

Other development possibilities of the method make provision that, after determining the sag and the length, calculated therefrom, of the upper edge and/or the width of the laundry item, with corner regions on opposite ends of the edge of the laundry item being held by the holding means, said laundry item is transferred directly from the holding means to two spreading clamps of a spreading clamp pair. Alternatively, there can be provision that the corner regions of the respective measured laundry item are first transferred from the holding means to other holding means which only then transfer the laundry item to the two spreading clamps of a respective spreading clamp pair by adjacent corner regions of the measured front or upper edge. The stated procedures ensure that the upper edge of the respective laundry item is measured before it is transferred to the spreading clamps. The sag measurement and in particular also the width or length determination of the edge derived therefrom are thus already completed before the laundry item comes into the influencing region of the spreading device. The spreading operation of the laundry item can thus occur rapidly because a measurement no longer has to be carried out during the spreading operation. In addition, the length of the front edge of the respective laundry item can be determined as it were statically if the laundry item is still situated in the preferably stationary holding means. This preferably occurs with holding means awaiting the transfer of the laundry item to the spreading clamps of a free spreading clamp pair.

The method is advantageously designed such that the length of the edge is determined computationally from the spacing dimension, obtained in the spacing measurement occurring from above in a perpendicular direction to the edge, of the lowest point or of the lowest region of the sagging edge between the corner regions of the laundry item which are held by the holding means on the basis of the known positions of the holding means and of the at least one detection means. Because the position of the holding means is known and is preferably always the same and also the at least one detection means is arranged in a positionally fixed manner above an imaginary connection line of the holding means for holding opposite corner regions of the upper edge of the respective laundry item, the respective length of the upper edge held by the holding means at opposite corner regions can be reliably determined from this fixed position or from positions which remain the same at least during the measurement of the spacing dimension. As seen in the feeding direction of the laundry item, the measured upper edge preferably corresponds to the width of the laundry item or feeding width thereof. In the way described above it is possible, from the perpendicular spacing dimension, determined by the at least one detection means, from above to the sagging measured edge, to contactlessly determine the length of this edge and thus the width or, where appropriate, length of the laundry item. This results, during spreading, in the maximum permissible spacing of the spreading clamps, that is to say the maximum extent to which the spreading clamps of the respective spreading clamp pair may be moved apart when spreading out the laundry item without excessively loading the edge in tension during spreading out.

An apparatus for achieving the object stated at the outset is an apparatus, in particular feeding machine, for spreading out laundry items, having a spreading device which has at least two spreading clamps, which can be moved apart and together, for adjacent corner regions or corners of an edge of the respective laundry item, and having at least one detection means for determining the length or the sag of the front edge of the laundry item to be stretched out by the spreading device, wherein the at least one detection means is assigned to holding means, arranged upstream of the spreading device, of adjacent corners or corner regions of the edge to be measured of the laundry item. In this apparatus, there is provision to arrange at least one detection means above an imaginary horizontal connection line of adjacent corner regions of the edge to be measured of the laundry item. As a result, the at least one detection device, preferably its at least one sensor, views from above the upper edge, which still has a sag and is to be measured, in particular transverse edge, of the laundry item to be spread out. Objects situated behind and ahead of the laundry item, in particular other laundry items, thus do not, or at any rate do not significantly, impede or falsify the measurement of the edge of the respective laundry item.

There is preferably provision to arrange the at least one detection means above the laundry item, in particular above the upper edge to be measured of the laundry item. For this purpose, the at least one detection means is preferably situated perpendicularly above the edge of the laundry item. The at least one detection means is preferably arranged in a perpendicularly directed manner on an imaginary horizontal connection line of the holding means, in particular somewhat above. The measurement axis of the respective detection means is thus directed perpendicularly downward, with the result that other laundry items situated at head of or behind the laundry item to be measured do not get in the way and do not falsify the measurement result.

By virtue of measuring from above the sag of the upper edge of the laundry item upstream of the spreading device, the latter no longer needs to be incorporated in the measurement of the length of the upper edge of the laundry item. On the basis of the determined sag of the upper edge of the laundry item hanging down below the holding means, it is possible, before said laundry item is spread out by the spreading device, to determine the length of the upper edge, in particular of the upper transverse edge, of the laundry item and thus the so-called spreading degree. This spreading degree is the spacing to which the spreading clamps would have to be moved apart during the spreading out of the laundry item in order to spread out the laundry item sufficiently, in particular to stretch out the upper edge or leading transverse edge of the laundry item to such an extent that the edge has only a minimum sag which does not result in damage to the laundry item. By virtue of the previously measured and/or calculated length of the upper edge or of the transverse edge of the laundry item, the adjacent corner regions, preferably corners, of the upper edge to be stretched out of the laundry item can be moved apart by the spreading clamps of the spreading device in a targeted and controlled manner in order as far as possible to reduce the sag of the upper edge, resulting in rapid and precise spreading out of the laundry item without excessively stretching and in so doing possibly damaging the latter, in particular the upper edge thereof.

BRIEF DESCRIPTION OF THE DRAWINGS

Preferred exemplary embodiments of the invention will be explained in more detail below with reference to the drawings. In the drawings.

DETAILED DESCRIPTION OF PREFERRED EMBODIMENTS

Figure 1:
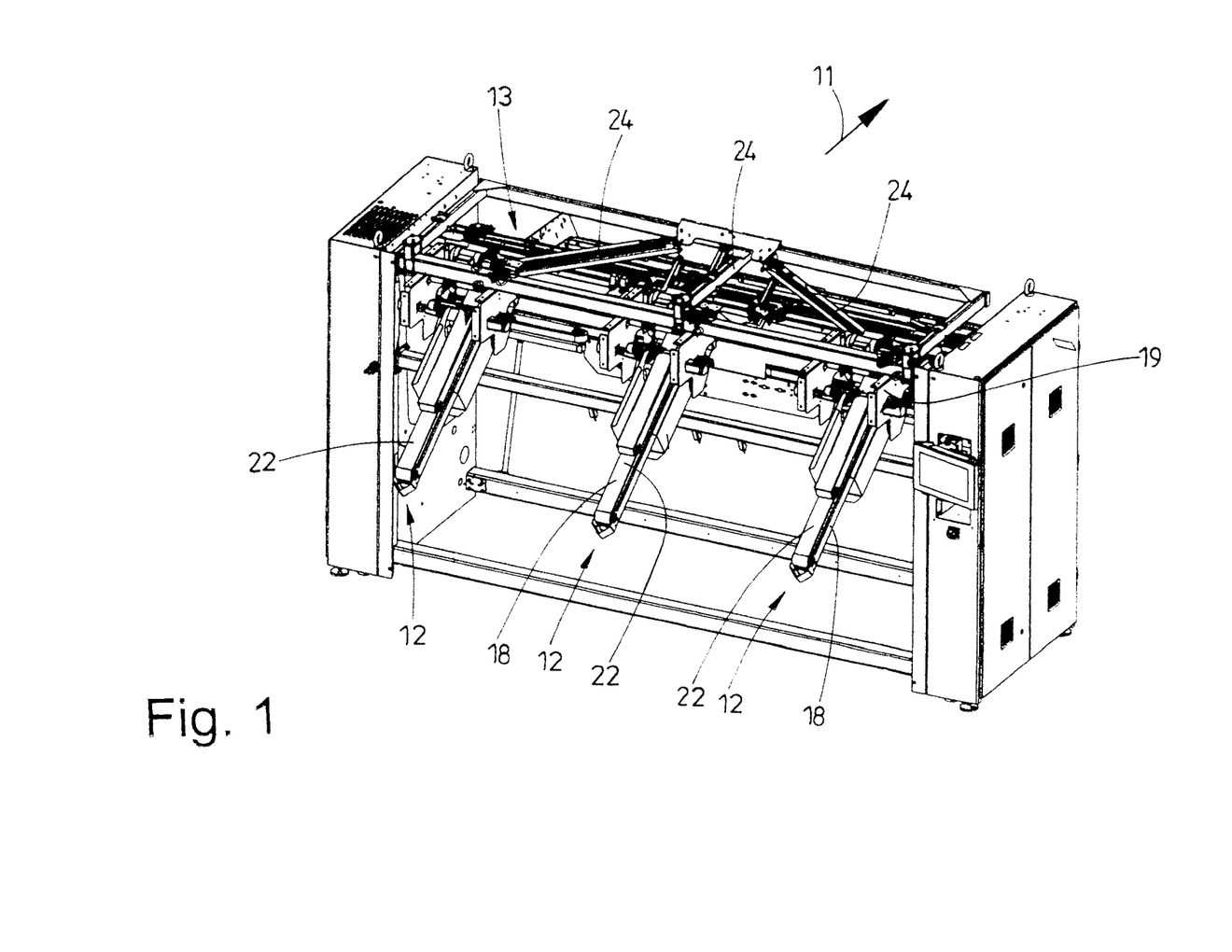
FIG. 1 shows a perspective overall view of an apparatus designed as a feeding machine.
Figure 2:
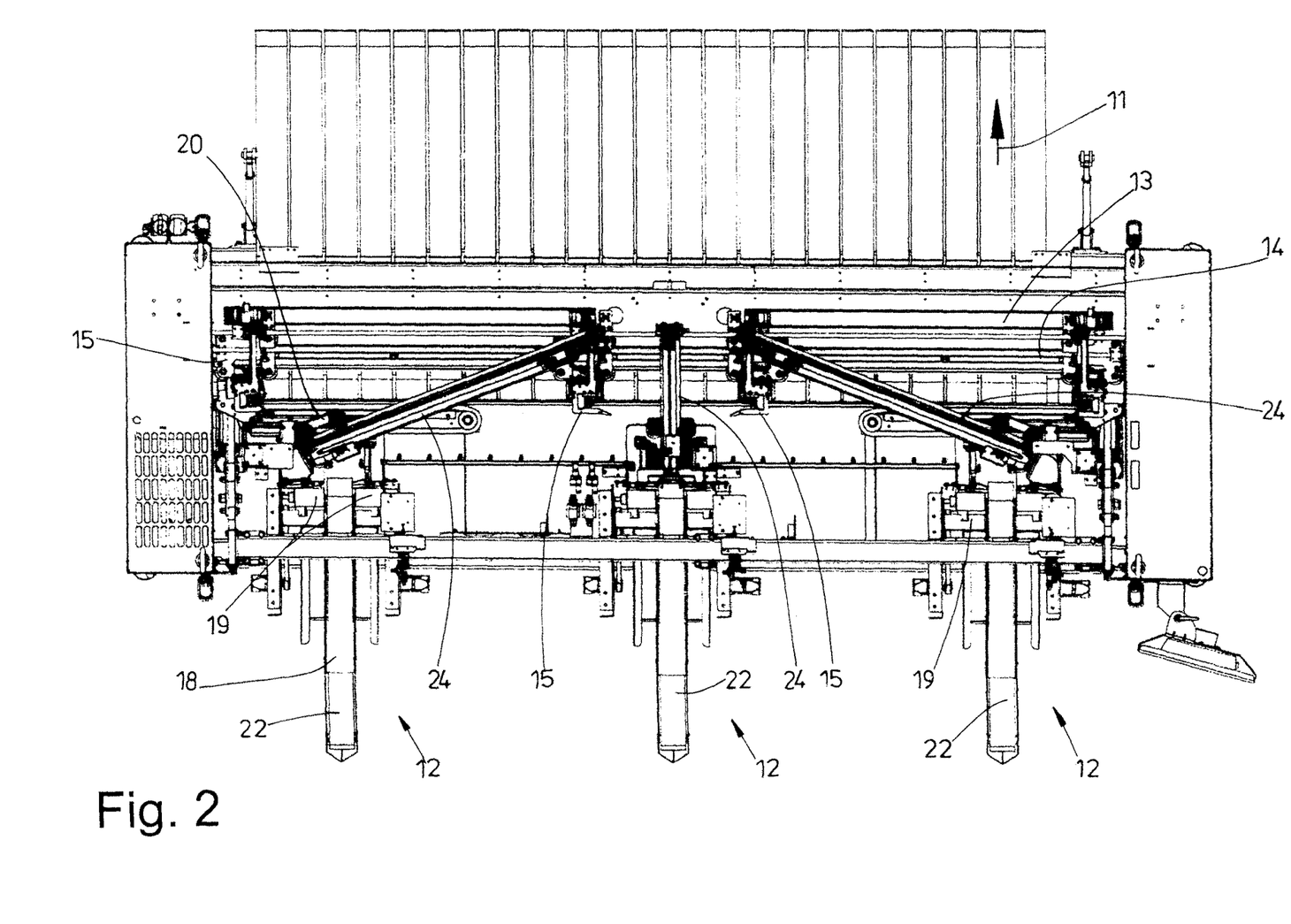
FIG. 2 shows a plan view of the apparatus of FIG. 1.

The figures show an apparatus which is designed as a feeding machine. FIGS. 1 and 2 illustrate the feeding machine completely. The feeding machine serves to feed laundry items 10, illustrated only in FIGS. 3, 4 and 6, specifically in particular flat laundry items, such as bed sheets, bed covers, pillowcases, hand towels, tablecloths or the like, in a feeding direction 10 to a mangle (not shown in the figures). However, the apparatus can also serve to feed laundry items 10 to other laundry treatment devices, for example folding machines.

The laundry items 10 are spread out by the apparatus designed as a feeding machine before being fed to a following laundry treatment device. In the technical jargon, this is also referred to as stretching out of the laundry items 10.

The apparatus or feeding machine illustrated here has three identically designed loading stations 12. The loading stations 12 are assigned with equal spacing from one another in a row, which extends transversely to the feeding direction 11, of the front side of the feeding machine. The invention is also suitable for feeding machines having a larger or smaller number of loading stations 12, specifically also for feeding machines having only a single loading station 12. In particular, the invention is also suitable for feeding machines having other loading stations 12. The invention is therefore not intended to be limited to the apparatus shown in the figures and in particular not to the loading stations 12 shown here.

Each loading station 12 has a loading conveyor 18 which transports the laundry item 10 in the feeding direction 11. Each of the identically designed loading conveyors 18 of the respective loading station 12 has two narrow, preferably equally wide, belt conveyors each having a circulating conveyor belt. The belt conveyors are arranged above one another to form a sandwich conveyor, the upper belt conveyor being shorter than the lower belt conveyor in order to form an exposed laying-on region 22 on the exposed front region of an upper strand of the longer lower belt conveyor.

The rear end of each loading conveyor 18, as seen in the feeding direction 11, is assigned two corner locators 19. The corner locators 19 first grasp adjacent corners 16 of the subsequent rear transverse edge 17 of the laundry item 10 from the loading conveyor 18. This transverse edge 17 is thus the front transverse edge 17 of the laundry item 10 which is to be stretched or to be spread by a spreading device 13 and which, leading in the feeding direction 11 and oriented transversely to the feeding direction 11, is to be fed to the mangle or the like. The corner locators 19 are assigned to the rear end of the lower belt conveyor, specifically on both sides next to the rear end of the lower belt conveyor and partially behind. Each of the corner locators 19, which are preferably identically designed but are oriented in mirror-image fashion by being arranged on opposite sides of the rear end of the lower belt conveyor, has two rollers which together form a roller pair with parallel longitudinal center axes or axes of rotation. A roller nip 23 is formed between the rollers of the roller pair. One roller of each corner locator 19 can be rotationally driven. However, the driveable rollers of each corner locator 19 which are situated on opposite sides of a belt conveyor can be separately driven independently.

A transfer clamp pair 20 having two transfer clamps 21 follows the corner locators 19 of each loading station 12. The transfer clamp pair 20 of the respective loading station 12 receives adjacent corner regions, preferably corners 16, of the not yet stretched-out (sagging) transverse edge 17 of the laundry item 10 from the corner locators 19 and transports said laundry item to two spreading clamps 15 of a spreading clamp pair of the spreading device 13. The spreading clamps 15 then receive the corners 16 of the transverse edge 17 of the laundry item 10 from the transfer clamps 21 of the transfer clamp pair 20, or the corners 16, which delimit the transverse edge 17 of the laundry item 10, in the still non-spread-out state with still sagging transverse edge 17 are transferred by the transfer clamps 21 of the transfer clamp pair 20 to the spreading clamps 15.

A transfer clamp pair 20 is provided between the corner locators 19 of each loading station 11 and the spreading device 13. In each case a transfer clamp 21 of a transfer clamp pair 20 is here assigned to each of the two opposite corner locators 19 of each loading station 12. For this purpose, the two transfer clamps 21 of each transfer clamp pair 20 are combined. The respective transfer clamp pair 20 thus forms a double clamp for in each case one of the opposite corners 16 of the transverse edge 17 of the laundry item 10.

The transfer clamp pair 20 of each loading station 12 can be moved on a carriage along a rail 24. The rail 24 of the central loading station 12 extends, in the apparatus shown, rectilinearly in the feeding direction 11 along the center of the feeding machine and of the feeding conveyor 17. This rail 24 extends in an upwardly directed manner in the feeding direction. Longer rails 24 extending obliquely upward and in the direction of the spreading device 12 emanate from the outer loading stations 12. The two rails 24 of the opposite outer loading station 11 are of equal length but differently directed, with the result that their rear ends as seen in the feeding direction are directed to converge toward the center of the feeding machine, but terminate upstream of the center, specifically just like the rail 24 assigned to the central loading station 11. The ends of the rails 24 of all transfer clamp pairs 20 lie on a common horizontal (imaginary) line which extends parallel to the at least one rail 24 of the spreading device 13, but at a distance in front and/or above. The lengths of the rails 24 and the positionings of their ends pointing to the spreading device 13 are such that the spreading clamps 15 can run past the transfer clamps 21 in a collision-free manner.

Figure 3:
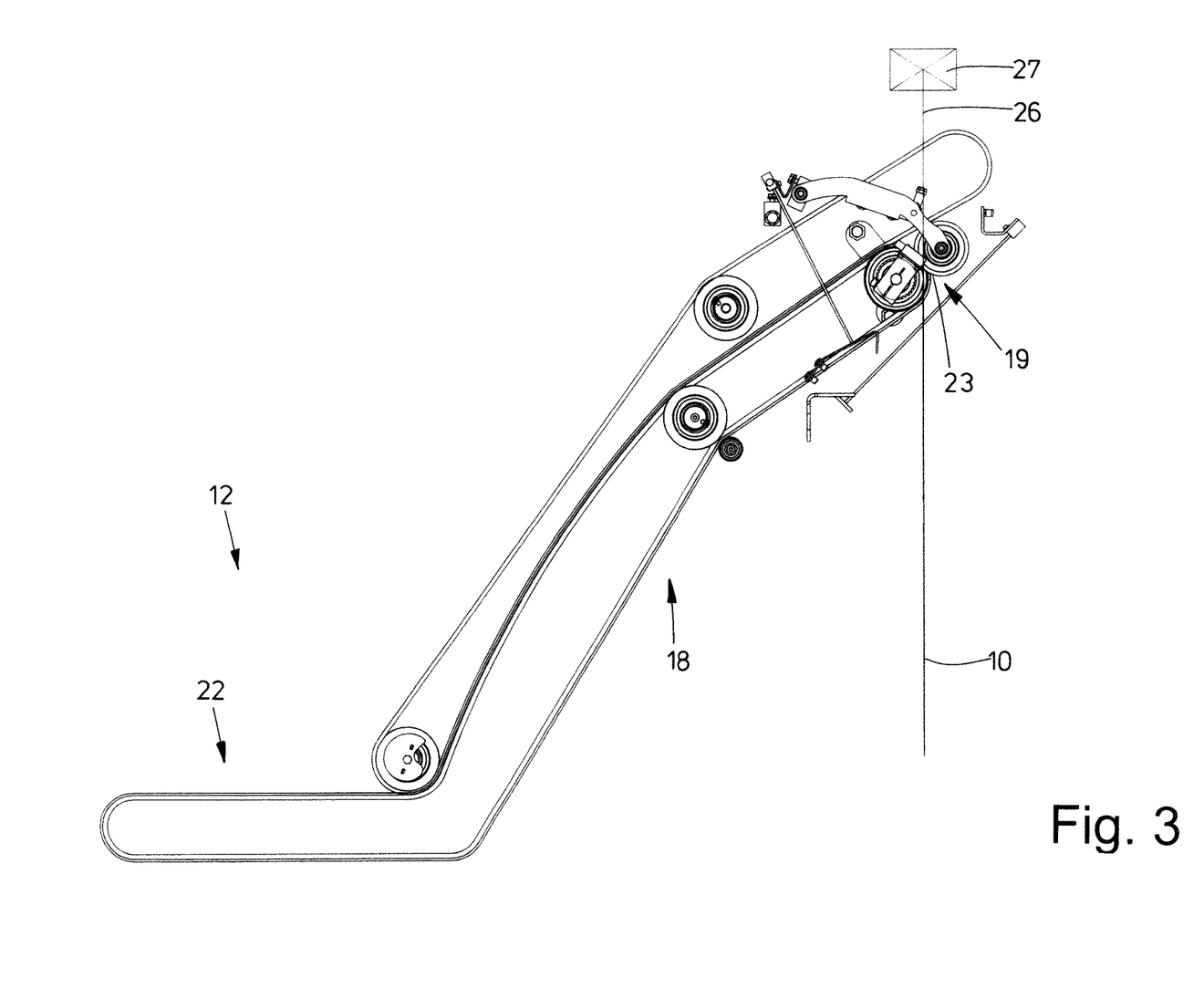
FIG. 3 shows a side view of a loading station of the apparatus of FIGS. 1 and 2.
Figure 4:
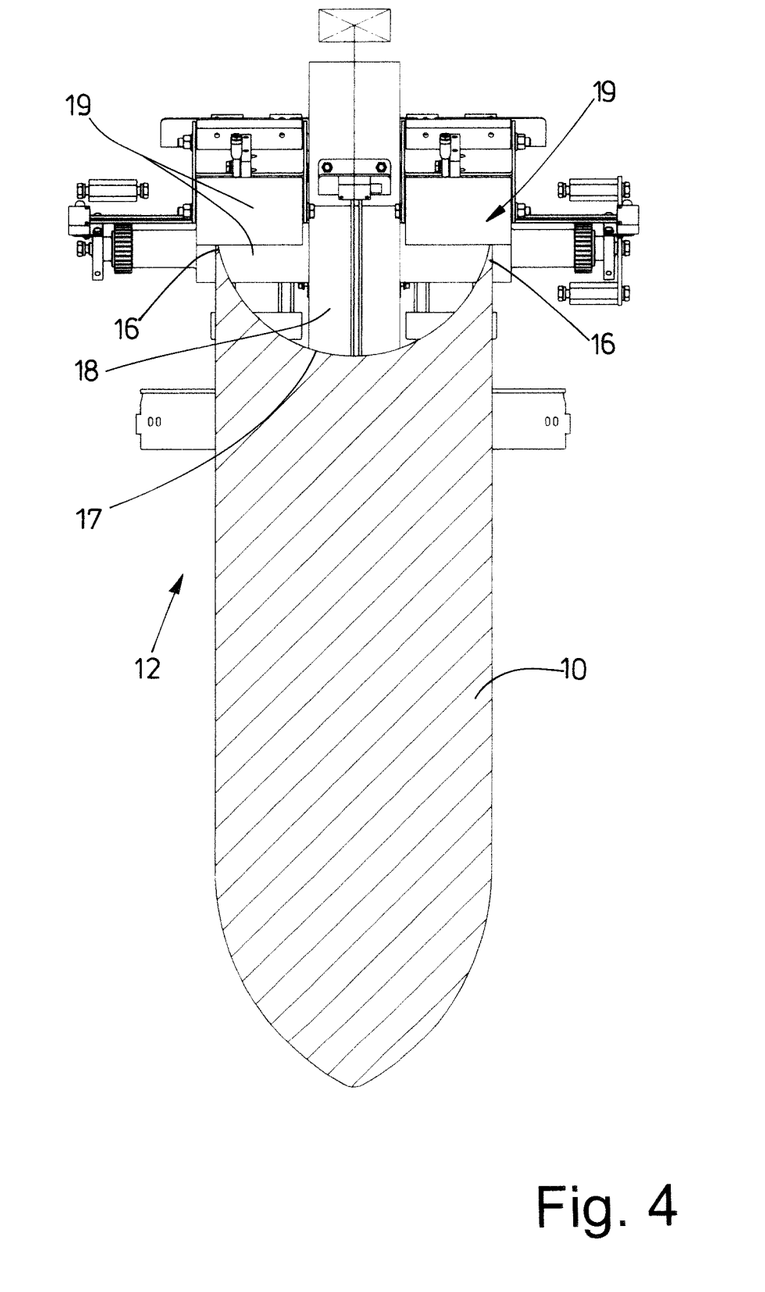
FIG. 4 shows a front view of the loading station with a laundry item.

In the exemplary embodiment of FIGS. 3 and 4, each loading station 12 is assigned detection means which are sensors 27 in the exemplary embodiment shown. At the rear, upper end of each loading conveyor 18, a detection means 18 is assigned above an imaginary horizontal connection line between the two corner locators 19 on opposite sides of the loading conveyor 18. The detection means is designed to contactlessly determine, in particular measure, from above the sag of the transverse edge 17 of the laundry item 10 held at adjacent corners 16 in the roller nip 23 of the interacting roller pair of each corner locator 19.

The detection means is arranged centrally between the corner locators 19 assigned to opposite sides of the loading conveyor 18, specifically such that a measurement beam 26 of the detection means perpendicularly intersects the imaginary horizontal connection line between opposite corner locators 19 of the respective loading station 12. Here, the measurement beam 26 can also extend in a perpendicularly directed manner. Furthermore, the detection device is arranged between the corner locators 19 in such a way that it is situated slightly above the imaginary connection line of the corner locators 19, specifically in a positionally fixed manner. The measurement beam 26 and the imaginary horizontal connection line of the corner locators 19 here preferably lie in a common vertical plane in which at any rate for the most part also the laundry item 10, with corners 16 held in the roller nips 23 of the roller pairs of the corner locators 19, hangs down from the corner locators 19 (FIG. 3). As a result, the measurement beam 26 of the detection means extends along the vertical longitudinal center axis of the laundry item 10 held at opposite corners 16 of the transverse edge 17 by the corner locaters 19 (FIG. 4). In this way, the detection means can contactlessly determine, by a spacing measurement, the lowest point of the sag of the transverse edge 17 of the laundry item 10. For this purpose, the detection means is designed as a sensor 27 which contactlessly measures from top to bottom its spacing from the lowest point of the sag of a transverse edge 17 of the laundry item 10 in the state shown in FIG. 4 in which it is held on the corner locators 19.

The sensor 27 is preferably one which determines an analog measurement signal or an analog measurement value. The respective sensor 27 is furthermore designed in such a way that it very quickly delivers the measurement results, in particular measurement signals following one another closely in time. For this purpose, the sensor 27 delivering analog measurement signals is designed in such a way that it delivers measurement signals, in particular length and/or spacing measurement values, with a starting measurement frequency of below 20 ms.

The method according to the invention will be explained below with reference to the above-described apparatus or feeding machine of the exemplary embodiment of FIGS. 1 to 4:

In each case an individual laundry item 10 is laid manually onto the laying-on region 22 of the loading conveyor 18 of a loading station 12. The laundry item 10 is then transported by the loading conveyor 18 to the corner locators 19 assigned to the two opposite sides of the upper end of the loading conveyor 18. The corner-locating process is concluded when the corner locators have fixed and held, in the roller nips 23 of their roller pairs, opposite corners 16 or corner regions of the transverse edge 17 of the laundry item 11 (FIG. 4).

During an instantaneous standstill of the laundry item 10, the sensor 27 of the detection means then contactlessly measures from above the central lowest point of the sag between the opposite corners 16, held by the corner locators 19, of the upper transverse edge 17 of the laundry item 10. This occurs by a spacing measurement between the lowest point of the sagging transverse edge 17 of the laundry item 10 and the sensor 27. The spacing value corresponds to the length of a perpendicular measurement beam 26 which is directed from above onto the transverse edge 17 of the laundry item 10 and extends through the vertical longitudinal center axis of the laundry item 10 hanging down from the corner locators 19.

On the basis of the fixed position of the corner locators 19 assigned to opposite sides of the loading conveyor 18, in particular on the basis of their spacings from one another and from the sensor 27, the length of the transverse edge 17 between the corners 16 can be calculated from the spacing between the lowest point of the sag of the transverse edge 17 of the laundry item 10 and the sensor 27, that is to say from the length of the preferably perpendicular measurement beam 26. On the basis of this calculated length, the displacement travel by which the spreading clamps 15 of the spreading device 13 have to be moved apart to spread out the laundry item 10 can be calculated or predetermined for the targeted displacement, in particular movement apart of the spreading clamps 15 of the respective spreading clamp pair.

After the sag of the transverse edge 17 has been contactlessly determined, with the laundry item 10 held by the corner locators 19 in the stationary state, that is to say statically, the laundry item 10 is transferred from the corner locators 19 to the transfer clamps 21 of the transfer clamp pair 20 assigned to the relevant loading station 12. These transport the laundry item 10 into a transfer position to the spreading device 13. As soon as the transfer clamp pair 20 has reached this position, the laundry item 10 is transferred from the transfer clamps 21 to the spreading clamps 15 of the relevant spreading clamp pair of the spreading device 13. The spreading clamps 15 of the respective spreading clamp pair of the spreading device 13 receive the laundry item 10 in the moved-together state, that is to say at the spacing of the corners 16 of the transverse edge 17 that corresponds to the spacing with which the corners have been held in the transfer clamps 21 and also the corner locators 19. This preferably corresponds to the spacing of the corners 16 in the spacing measurement of the lowest point of the sag of the laundry item 10 held on the corner locators 19 from the sensor 27, that is to say the length of its measurement beam 26.

On the basis of the sag measured on the laundry item 10 hanging in the corner locators 19 and of the length, calculated therefrom, of the transverse edge 17 of the laundry item 10, the spreading clamps 15 are then moved apart in a targeted manner to such an extent that the transverse edge 17 of the laundry item is spread out to the intended degree by the spreading clamps 15, with, on the one hand, a maximum residual sag of the transverse edge 17 not being exceeded and, on the other hand, the tensile force exerted by the spreading clamps 15 on the upper transverse edge 17 during spreading out not being greater than permissible.

It is also conceivable that the movement apart of the spreading clamps 15 occurs in dependence on the previously determined length of the transverse edge 17 in a plurality of stages or steps with in each case different speeds. For example, the spreading clamps 15 are first of all moved apart relatively quickly, but retarded shortly before reaching the calculated length of the transverse edge 17 and moved apart at a lower speed in order to completely spread out the laundry item 10 more slowly. This allows an exact approach to the position of the spreading clamps 15 which leads to the greatest possible spreading out of the laundry item 10 and allows the greatest possible care of the laundry item 10 during the complete and/or greatest possible spreading out or stretching.

Figure 5:
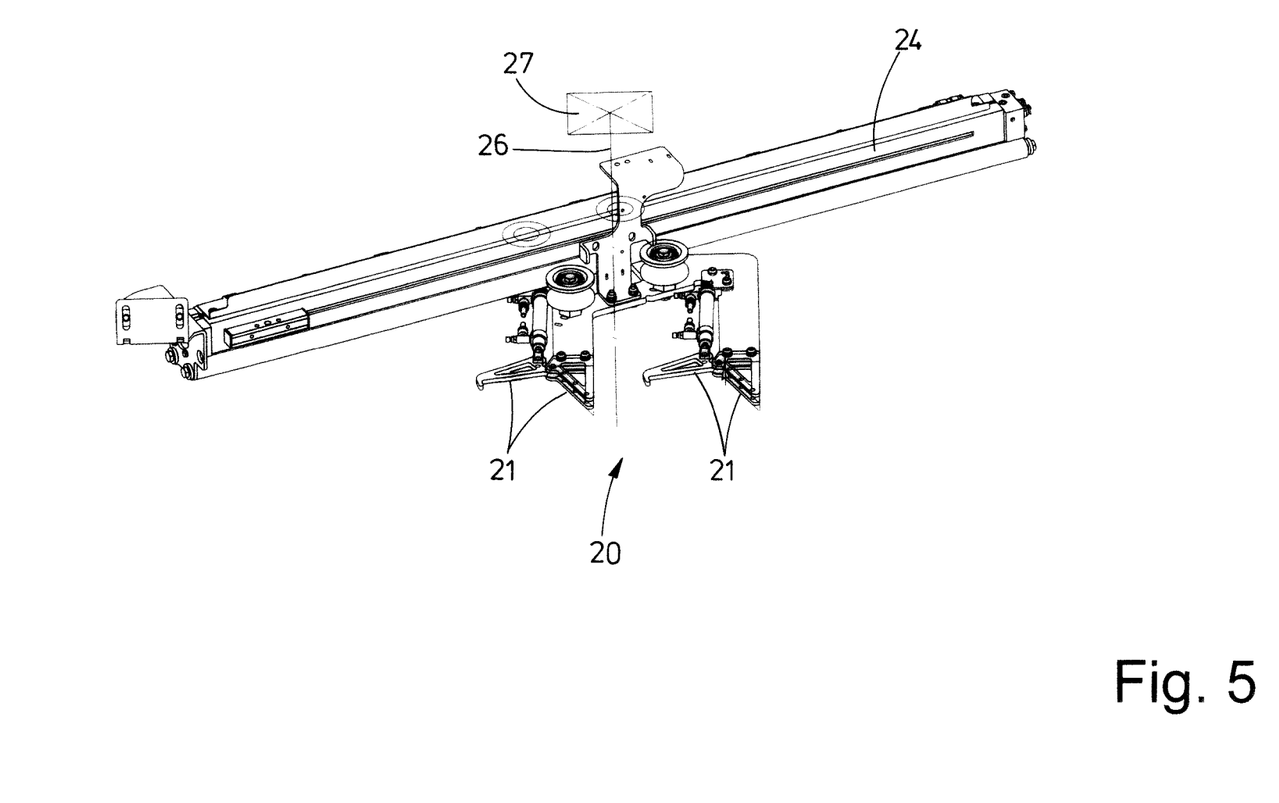
FIG. 5 shows a perspective view of a transfer clamp pair of the apparatus of FIGS. 1 and 2.
Figure 6:
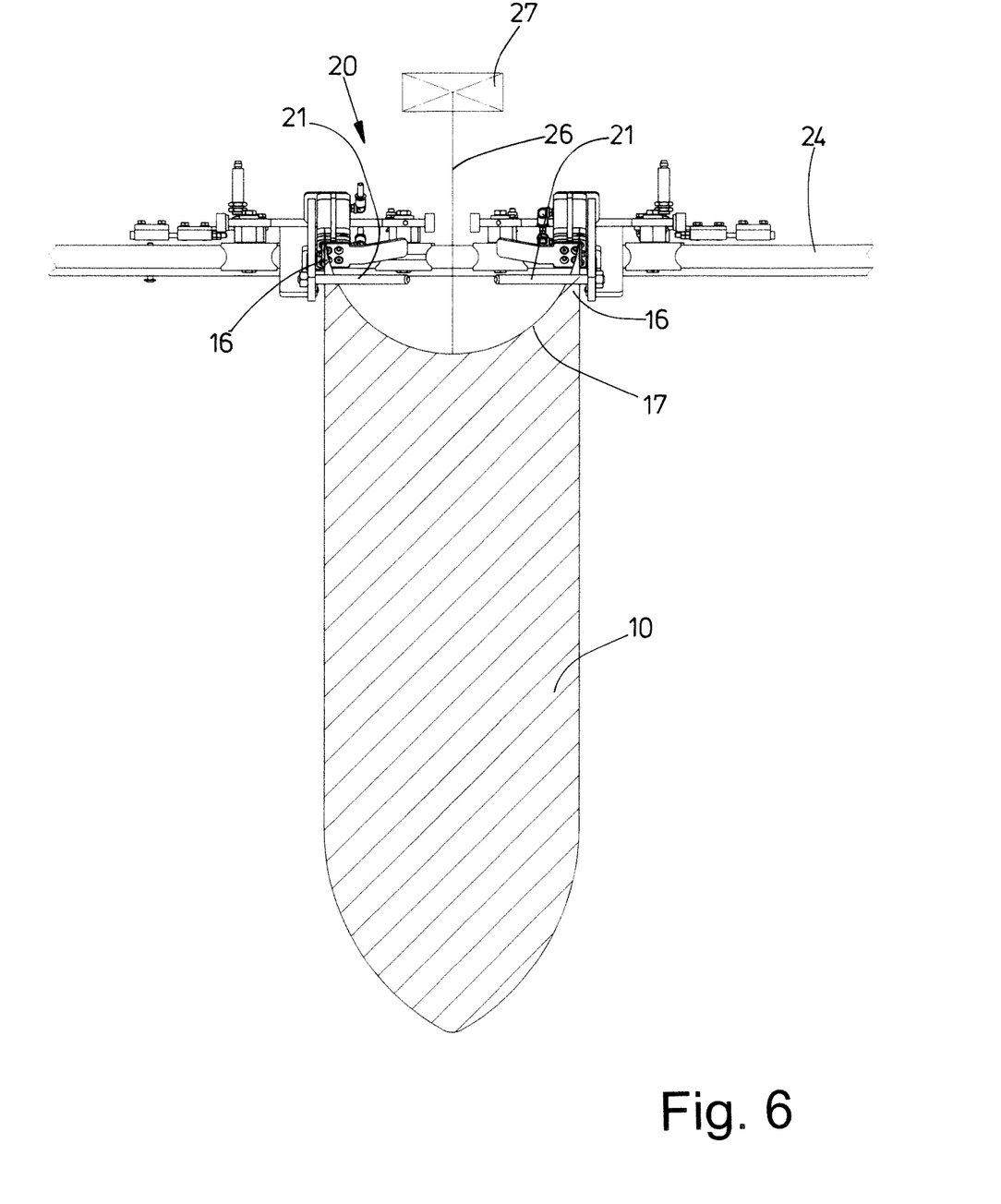
FIG. 6 shows a front view of the transfer clamp pair of FIG. 5 with a laundry item suspended thereon.

FIGS. 5 and 6 show a second exemplary embodiment of the apparatus, which differs from the above-described apparatus only in that a detection means is assigned not to the corner locators 19 of each loading station 12 but to the transfer clamp pairs 20 following the corner locators 19 of each loading station 12.

In this exemplary embodiment, a sensor 27 serving as detection means is provided above the respective transfer clamp pair 20, to be precise centrally between the transfer clamps 21, forming a double clamp, of the respective transfer clamp pair 20. The sensor 27 is situated above the transfer clamp pair 20 in such a way that its perpendicularly directed measurement beam 26 perpendicularly intersects an imaginary horizontal connection line between the two transfer clamps 21 of the transfer clamp pair 20 (FIG. 6). Here, the measurement beam 26 and the imaginary connection line between the transfer clamps 21 lie in one plane. This plane preferably corresponds to the plane of the laundry item 10 hanging down perpendicularly from the transfer clamps 21. The measurement beam 26 then extends through a vertical longitudinal center axis of the laundry item 10 which is held by opposite corners 16 of the transverse edge 17 by the transfer clamps 21 and hangs down from the respective transfer clamp pair 20.

The sensor 27 of the exemplary embodiment of FIGS. 5 and 6 also contactlessly measures the perpendicular spacing to the lowest point of the transverse edge 17 held by its opposite corners 16 by the transfer clamps 21. The measurement preferably takes place with the transfer clamps instantaneously at a standstill, for example after they have received the laundry item 10 from the corner locators 19 or the transfer clamp pair 20 awaits the transfer of the laundry item 10 to the spreading clamps 15 of the spreading device 13.

The method according to the invention proceeds, with the detection means or sensor 27 directed from above, preferably perpendicularly from above, on the sagging transverse edge 17, in exactly the same way as described above in conjunction with the exemplary embodiment of FIGS. 3 and 4. Reference is made thereto.

In the light of the foregoing, in both exemplary embodiments of the invention, before the transfer of the corners 16 of the transverse edge 17 of the laundry item 10 to the spreading clamps 15, the length of the transverse edge 17 is determined from a spacing dimension, determined contactlessly by the detection means, between the detection means and the point of the lowest sag of the transverse edge 17. There is preferably provision that the detection means is arranged above the transverse edge 17 and hence the measurement beam 26 generated by the detection means is preferably directed in a perpendicularly directed manner from above onto the transverse edge 17, namely the lowest point of its sag between the transfer clamps 21 or the corner locators 19.

LIST OF REFERENCE SIGNS

10 laundry item
11 feeding direction
12 loading station
13 spreading device
15 spreading clamp
16 corner
17 transverse edge
18 loading conveyor
19 corner locator
20 transfer clamp pair
21 transfer clamp
22 laying-on region
23 roller nip
24 rail
26 measurement beam
27 sensor

What is claimed is:

1. A method for spreading out laundry items (10), a laundry item (10) held in each case at two adjacent corner regions or corners (16) of an edge by two spreading clamps (15) of a spreading device (13) being spread out by targeted movement apart of the spreading clamps (15) while taking into consideration the determined length of the edge, in order to eliminate or at least largely eliminate the sag of the edge (17) of the laundry item (10), wherein, before transferring the corner regions or corners (16) of the edge of the laundry item (10) to the spreading clamps (15), with adjacent corner regions or corners (16) of the edge of the laundry item (10) held by holding means arranged upstream of the spreading device (13), the edge between the corner regions or corners (16) of the respective laundry item (10) which are held by the holding means is measured and the length of the edge is determined therefrom.

2. The method as claimed in claim 1, wherein the length of the edge of the laundry item (10) is determined from a spacing measurement carried out by the at least one detection means arranged above the edge.

3. A method for spreading out laundry items (10), a laundry item (10) held in each case at two adjacent corner regions or corners (16) of an edge by two spreading clamps (15) of a spreading device (13) being spread out by targeted movement apart of the spreading clamps (15) while taking into consideration the determined length of the edge, in order to eliminate or at least largely eliminate the sag of the edge (17) of the laundry item (10), wherein, before transferring the corner regions or corners (16) of the edge of the laundry item (10) to the spreading clamps (15), with adjacent corner regions or corners (16) of the edge of the laundry item (10) held by holding means arranged upstream of the spreading device (13), the edge between the corner regions or corners (16) of the respective laundry item (10) which are held by the holding means is measured and the length of the edge is determined therefrom, wherein, before transfer to the spreading device (13), the length of the edge of the laundry item (10) is determined from a measurement of the sag of the edge held at its adjacent corner regions or corners (16) by the holding means.

4. The method as claimed in claim 3, with the spacing of the holding means remaining the same or with the holding means instantaneously at a standstill.

5. A method for spreading out laundry items (10), a laundry item (10) held in each case at two adjacent corner regions or corners (16) of an edge by two spreading clamps (15) of a spreading device (13) being spread out by targeted movement apart of the spreading clamps (15) while taking into consideration the determined length of the edge, in order to eliminate or at least largely eliminate the sag of the edge (17) of the laundry item (10), wherein, before transferring the corner regions or corners (16) of the edge of the laundry item (10) to the spreading clamps (15), with adjacent corner regions or corners (16) of the edge of the laundry item (10) held by holding means arranged upstream of the spreading device (13), the edge between the corner regions or corners (16) of the respective laundry item (10) which are held by the holding means is measured and the length of the edge is determined therefrom, wherein the sag of the edge of the laundry item (10) held at its adjacent corners (16) or corner regions by the holding means is determined from above.

6. The method as claimed in claim 5, wherein the sag of the edge of the laundry item (10) held at its adjacent corners (16) or corner regions by the holding means is determined from above by at least one detection means arranged above the edge.

7. The method as claimed in claim 5, wherein the length of the edge is determined computationally from the spacing dimension, obtained during the spacing measurement, of the lowest region of the sagging edge between the corners (16) or corner regions of the laundry item (10) which are held by the holding means on the basis of the known positions of the holding means and of the at least one detection means.

8. A method for spreading out laundry items (10), a laundry item (10) held in each case at two adjacent corner regions or corners (16) of an edge by two spreading clamps (15) of a spreading device (13) being spread out by targeted movement apart of the spreading clamps (15) while taking into consideration the determined length of the edge, in order to eliminate or at least largely eliminate the sag of the edge (17) of the laundry item (10), wherein, before transferring the corner regions or corners (16) of the edge of the laundry item (10) to the spreading clamps (15), with adjacent corner regions or corners (16) of the edge of the laundry item (10) held by holding means arranged upstream of the spreading device (13), the edge between the corner regions or corners (16) of the respective laundry item (10) which are held by the holding means is measured and the length of the edge is determined therefrom, wherein the length of the edge of the laundry item (10) is derived from a contactless spacing measurement carried out by the at least one detection means arranged above the edge from at least one measurement of a lowest point or of the lowest region of the sagging edge of the laundry item (10).

9. A method for spreading out laundry items (10), a laundry item (10) held in each case at two adjacent corner regions or corners (16) of an edge by two spreading clamps (15) of a spreading device (13) being spread out by targeted movement apart of the spreading clamps (15) while taking into consideration the determined length of the edge, in order to eliminate or at least largely eliminate the sag of the edge (17) of the laundry item (10), wherein, before transferring the corner regions or corners (16) of the edge of the laundry item (10) to the spreading clamps (15), with adjacent corner regions or corners (16) of the edge of the laundry item (10) held by holding means arranged upstream of the spreading device (13), the edge between the corner regions or corners (16) of the respective laundry item (10) which are held by the holding means is measured and the length of the edge is determined therefrom, wherein, after determining the length of the edge between the corners (16) or corner regions of the laundry item (10) which are held by the holding means, said corners or corner regions are transferred directly from the holding means to the spreading clamps (15) or are first transferred to other holding means which then transfer the laundry item (10) with adjacent corners (16) or corner regions of the edge, previously measured with respect to the sag, of the laundry item (10) to the spreading clamps (15).

10. A method for spreading out laundry items (10), a laundry item (10) held in each case at two adjacent corner regions or corners (16) of an edge by two spreading clamps (15) of a spreading device (13) being spread out by targeted movement apart of the spreading clamps (15) while taking into consideration the determined length of the edge, in order to eliminate or at least largely eliminate the sag of the edge (17) of the laundry item (10), wherein, before transferring the corner regions or corners (16) of the edge of the laundry item (10) to the spreading clamps (15), with adjacent corner regions or corners (16) of the edge of the laundry item (10) held by holding means arranged upstream of the spreading device (13), the edge between the corner regions or corners (16) of the respective laundry item (10) which are held by the holding means is measured and the length of the edge is determined therefrom, wherein, on the basis of the length of the edge of the laundry item (10) calculated with consideration to the sag of the edge of the laundry item (10) measured on the laundry item (10) hanging down from the holding means, after transferring the laundry item (10) to the spreading clamps (15) the latter are moved apart in a targeted and controlled manner to spread out the laundry item (10) in order to spread out the laundry item (10) with the lowest possible sag of the edge of the laundry item (10).

11. An apparatus, in particular feeding machine, for spreading out laundry items (10), having a spreading device (13) which has at least two spreading clamps (15), which can be moved apart and together, for adjacent corner regions or corners (16) of an edge of the respective laundry item (10), and having at least one detection means for determining the length or the sag of the front edge of the laundry item (10) to be stretched out by the spreading device (13), wherein the at least one detection means is assigned to holding means, arranged upstream of the spreading device (13), of adjacent corners (16) or corner regions of the edge to be measured of the laundry item (10), and where the at least one detection means is designed for contactless spacing measurement of a lowest point or a lowest region of the sag of the front edge of the laundry item (10) and arranged above the front edge of the laundry item (10).

12. The apparatus as claimed in claim 11, wherein the at least one detection means further is arranged above an imaginary connection line between the holding means.

13. The apparatus as claimed in claim 11, wherein the at least one detection means further is arranged centrally between the holding means which hold opposite corners (16) or corner regions of the front edge of the laundry item (10).

14. The apparatus as claimed in claim 11, wherein the at least one detection means further is arranged centrally between the holding means which hold opposite corners (16) or corner regions of the front edge of the laundry item (10), in order to determine a spacing dimension directed from above onto the lowest point of the front edge of the laundry item (10) held with sag between the holding means.

* * * * *